United States Patent
Hara et al.

(10) Patent No.: US 11,480,477 B2
(45) Date of Patent: Oct. 25, 2022

(54) HEAT UTILIZING DEVICE

(71) Applicant: TDK Corporation, Tokyo (JP)

(72) Inventors: Shinji Hara, Tokyo (JP); Naoki Ohta, Tokyo (JP); Susumu Aoki, Tokyo (JP); Eiji Komura, Tokyo (JP); Akimasa Kaizu, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 16/969,015

(22) PCT Filed: Mar. 6, 2018

(86) PCT No.: PCT/JP2018/008556
§ 371 (c)(1),
(2) Date: Aug. 11, 2020

(87) PCT Pub. No.: WO2019/171465
PCT Pub. Date: Sep. 12, 2019

(65) Prior Publication Data
US 2021/0025765 A1    Jan. 28, 2021

(51) Int. Cl.
*G01K 7/22* (2006.01)
*H01C 7/06* (2006.01)

(52) U.S. Cl.
CPC ........ *G01K 7/22* (2013.01); *H01C 7/06* (2013.01)

(58) Field of Classification Search
CPC .................................. H01C 7/07; G01K 7/22
See application file for complete search history.

(56) References Cited

U.S. PATENT DOCUMENTS

| | | | |
|---|---|---|---|
| 6,239,431 B1* | 5/2001 | Hilton | G01K 7/006 250/336.2 |
| 9,006,857 B1* | 4/2015 | Carr | G01J 5/023 257/469 |
| 2003/0219052 A1* | 11/2003 | Goodhue | H01S 5/3402 372/45.012 |
| 2011/0272581 A1 | 11/2011 | Noda | |
| 2017/0199082 A1* | 7/2017 | Corcos | G01J 5/023 |
| 2017/0356806 A1 | 12/2017 | Takahashi et al. | |
| 2020/0049573 A1* | 2/2020 | Kedambaimoole | G01K 7/186 |

(Continued)

FOREIGN PATENT DOCUMENTS

| | | |
|---|---|---|
| JP | H10-332480 A | 12/1998 |
| JP | 2007-316076 A | 12/2007 |
| JP | 2009-194085 A | 8/2009 |

(Continued)

OTHER PUBLICATIONS

International Search Report of the International Searching Authority dated May 22, 2018 for the corresponding International application No. PCT/JP2018/008556(and English translation).

*Primary Examiner* — Kyung S Lee
(74) *Attorney, Agent, or Firm* — Posz Law Group, PLC

(57) ABSTRACT

A heat utilizing device is provided in which the thermal resistance of the wiring layer is increased while an increase in electric resistance of the wiring layer is limited. Heat utilizing device has thermistor whose electric resistance changes depending on temperature; and wiring layer that is connected to thermistor. A mean free path of phonons in wiring layer is smaller than a mean free path of phonons in an infinite medium that consists of a material of wiring layer.

10 Claims, 13 Drawing Sheets

(56) References Cited

U.S. PATENT DOCUMENTS

2020/0191655 A1\* 6/2020 Carr .......................... G01J 5/16
2021/0381900 A1\* 12/2021 Carr .......................... G01J 5/20

FOREIGN PATENT DOCUMENTS

| JP | 2009-229260 | A | 10/2009 |
| JP | 2013-50365 | A | 3/2013 |
| JP | 2013-050365 | A | 3/2013 |
| JP | 2014-173850 | A | 9/2014 |
| JP | 5866881 | B2 | 2/2016 |
| JP | 6030273 | B1 | 11/2016 |
| JP | 2017-054975 | A | 3/2017 |
| WO | 2008/068386 | A1 | 6/2008 |

\* cited by examiner

HEAT UTILIZING DEVICE

CROSS REFERENCE TO RELATED APPLICATION

This application is a U.S. national stage application of PCT/JP2018/008556 filed on Mar. 6, 2018, the contents of which are incorporated herein by reference.

FIELD OF THE INVENTION

The present invention relates to a heat utilizing device, particularly to a heat utilizing device having a thermistor whose electric resistance changes depending on temperature

BACKGROUND OF THE INVENTION

The electrical resistance of a thermistor that is used as a thermal element in various types of temperature sensors changes depending on temperature. Therefore, the temperature around the thermistor can be detected by detecting a change in electric resistance of the thermistor. When a change in the temperature of the thermistor is caused by radiation heat, the temperature of an object that emits the radiation heat can be detected based on Stefan-Boltzmann law.

An effective way to improve the sensitivity of a thermistor, is to improve the thermal absorptivity of the thermistor. JP 5866881 and JP 60302732 disclose an infrared temperature sensor in which a lead that is connected to a thermal element for detecting infrared rays is formed in a meandering pattern. The thermal element for detecting infrared rays and the lead are disposed on a substrate, and the lead is formed into a circuit pattern on the substrate. The heat collecting effect of the lead enhances the sensitivity of the infrared temperature sensor.

SUMMARY OF THE INVENTION

In applications where the radiation heat of an object is measured in order to measure the surface temperature of the object, it is necessary only to detect the radiation heat from the object and to limit the effect of radiation heat from other objects. In a sensor in which electromagnetic wave that is emitted from an object is observed by converting the electromagnetic wave to heat on or near the thermistor, it is necessary to limit the heat dissipation from the thermistor in order to improve the temperature increase efficiency of the thermistor to the intensity of the incident electromagnetic wave. To this end, a thermistor is housed in a vacuum housing, and furthermore, the thermistor is arranged such that it floats in the vacuum housing via an arm-like support member. Thus, the heat dissipation from the thermistor through the atmosphere, as well as the heat dissipation from the thermistor to the housing through heat conduction, are limited.

However, in this configuration, the support member also functions to hold a wiring layer that supplies a current to the thermistor. The support member is typically made of an insulating material having physically high strength, but the wiring layer is made of a conductive material. In general, there is a positive correlation between the electric resistance and the thermal resistance (Wiedemann-Franz law), wherein the thermal resistance of an insulating material is large, and the thermal resistance of a conductive material is small. As a result, heat conduction in the support member is limited, but heat conduction in the wiring layer may reach a level that is not negligible. If the wiring layer is made of a material having low electric conductivity, then heat conduction can be limited, but an increase in electric resistance leads to an increase in power consumption. In addition, due to an increase of heat that is generated by the wiring layer, measurement error of the thermistor may be increased.

It is an object of the present invention to provide a heat utilizing device in which the thermal resistance of the wiring layer is increased while an increase in electric resistance of the wiring layer is limited.

A heat utilizing device of the present invention comprises: a thermistor whose electric resistance changes depending on temperature; and a wiring layer that is connected to the thermistor. A mean free path of phonons in the wiring layer is smaller than a mean free path of phonons in an infinite medium that consists of a material of the wiring layer.

The above and other objects, features and advantages of the present invention will become apparent from the following description with reference to the accompanying drawings which illustrate examples of the present invention.

Figure 1:
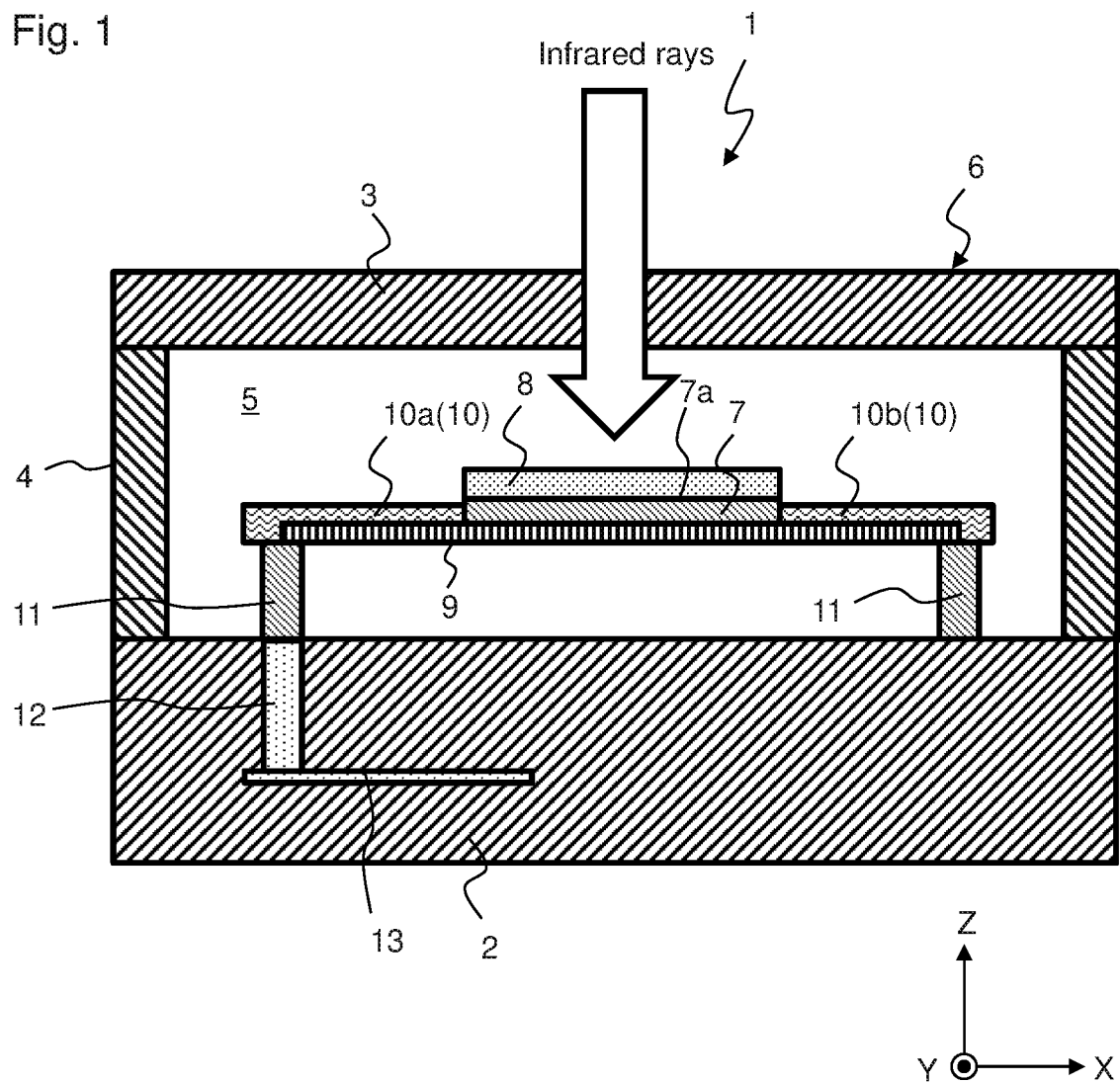
FIG. 1 is a schematic sectional view of an infrared sensor according to a first embodiment of the present invention.

LIST OF REFERENCE NUMERALS 1 infrared sensor
2 first substrate
3 second substrate
5 inner space 6 vacuum housing
7 thermistor film
8 infrared rays absorbing film
9 support layer
10, 20, 30, 40, 110 wiring layer
10a first wiring layer
10b second wiring layer
11 pillar
15 first insulating layer
16 second insulating layer
17 separating layer
18 single band region
20 wiring layer
21 first wiring layer
22 second wiring layer
30a to 30d first to fourth wiring layer
31 separating layer
31a to 31c first to third separating layer
41 scattered bodies
91 central portion
92 arm portion
92a first arm portion
92b second arm portion
93 first portion
94 second portion

DETAILED DESCRIPTION OF THE EMBODIMENTS

Hereinafter, various embodiments of a heat utilizing device of the present invention will be described with reference to the drawings. In the following descriptions and drawings, the X and Y directions are parallel to the main surfaces of first substrate 2 and second substrate 3. The Z direction is perpendicular both to the X direction and Y direction, and is perpendicular to the main surfaces of first substrate 2 and second substrate 3.

The heat utilizing device of the present invention has a thermistor whose electric resistance changes depending on temperature. For convenience of explanation, the heat utilizing device of each embodiment is an infrared sensor having a single thermistor film, but the heat utilizing device may have an array of thermistor films that are arranged in two dimensions. Such a heat utilizing device having an array of thermistor films is used as an image sensor of an infrared camera. An infrared camera may be used for a night vision scope or a night vision goggle in the dark, and may also be used to measure the temperature of a man or an object. Furthermore, an infrared sensor in which a plurality of thermistor films is arranged in one dimension may be used as a sensor that measures various kinds of temperature or temperature distribution. An infrared sensor in which a plurality of thermistor films is arranged in one dimension is also included in the scope of the present invention.

First Embodiment

Figure 2A:
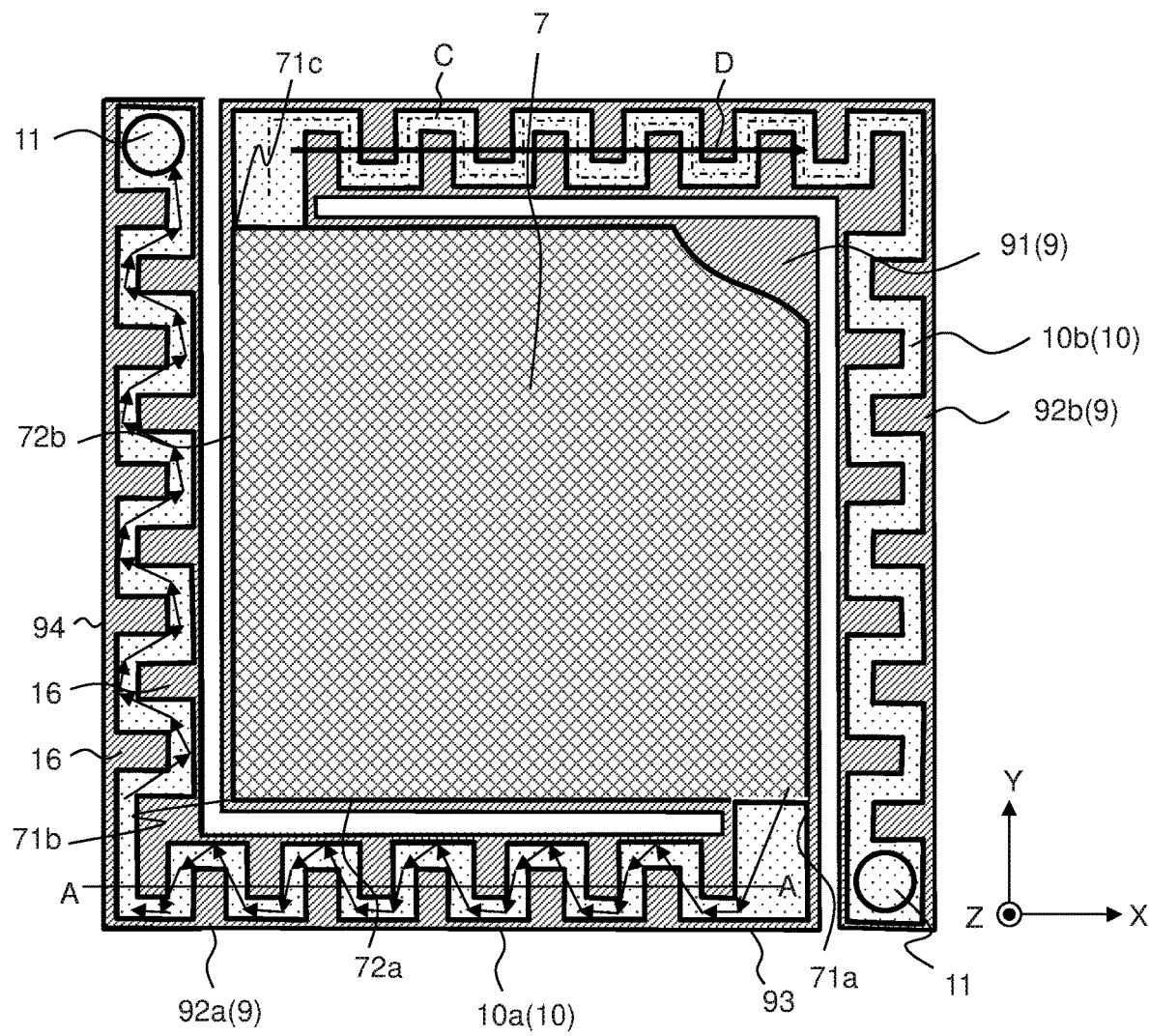
FIG. 2A is a schematic plan view in the vicinity of the thermistor film of the infrared sensor shown in FIG. 1.
Figure 2B:
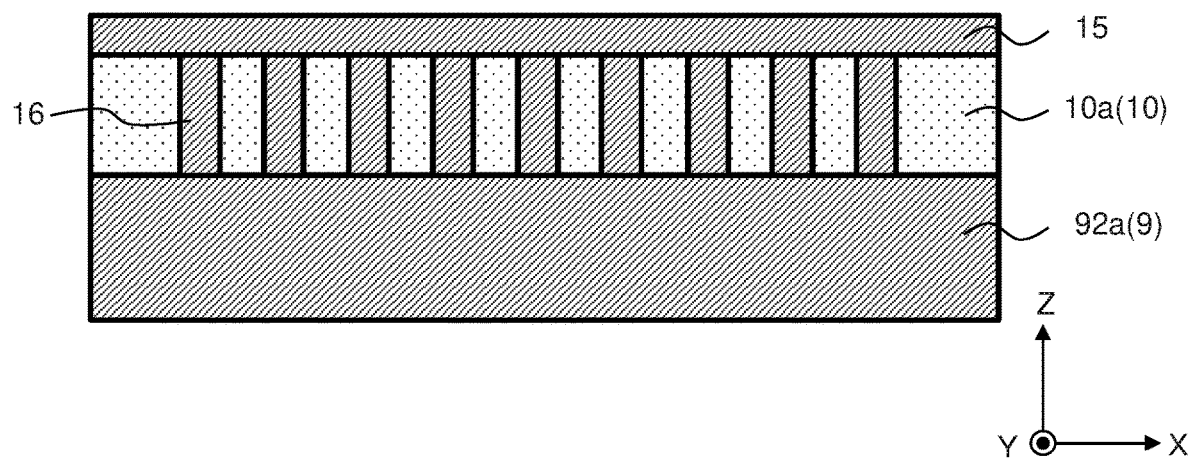
FIG. 2B is a sectional view of the wiring layer taken along line A-A in FIG. 2A.
Figure 2C:
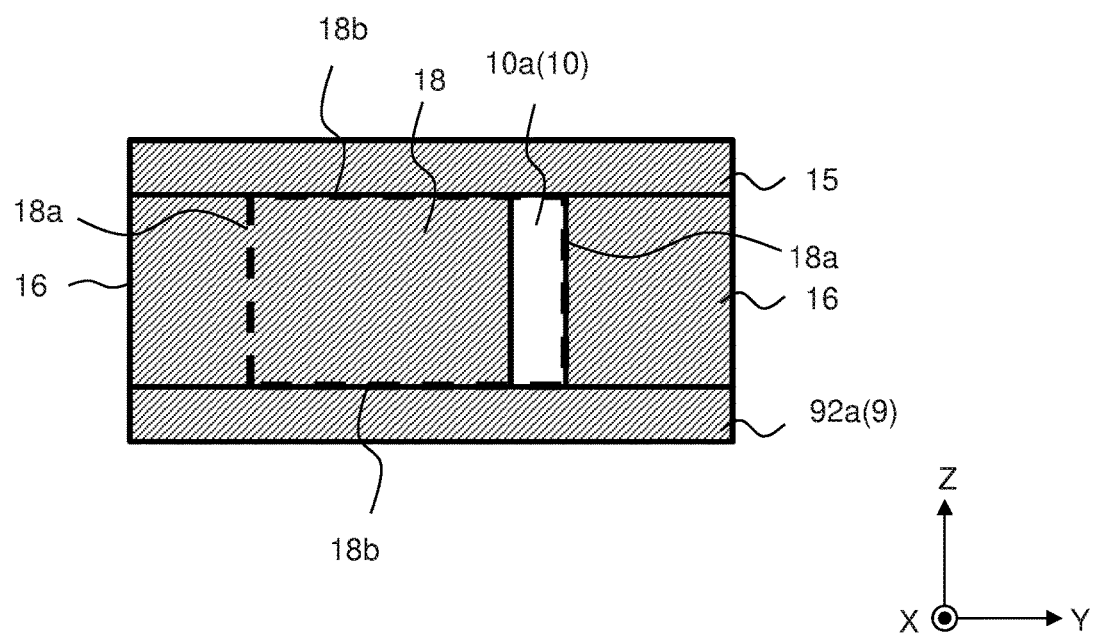
FIG. 2C is a sectional view of wiring layer 10, as viewed in the X direction.

FIG. 1 is a schematic side view of infrared sensor 1 of the first embodiment of the present invention, FIG. 2A is a schematic plan view in the vicinity of the thermistor film, FIG. 2B is a sectional view of wiring layer 10 taken along line A-A in FIG. 2A, and FIG. 2C is a sectional view of wiring layer 10, as viewed in the X direction. Thermistor film 7 is partially omitted in FIG. 2A in order to show central portion 91 of support layer 9.

Infrared sensor 1 has first substrate 2, second substrate 3 that faces first substrate 2, as well as side walls 4 that connect first substrate 2 and second substrate 3. Second substrate 3 is a window substrate into which infrared rays enter. First substrate 2, second substrate 3 and side walls 4 form tightly closed inner space 5. Thermistor film 7 is housed in inner space 5. Inner space 5 is at a negative pressure or forms a vacuum.

That is, first substrate 2, second substrate 3 and side walls 4 form tightly closed vacuum housing 6. As a result, the convection of gas in inner space 5 can be prevented or limited, and thermal influence on thermistor film 7 can be reduced.

Thermistor film 7 has a silicon substrate (not illustrated) and a film, made of vanadium oxide (VOx), that is formed on the silicon substrate. A film made of amorphous silicon (a-Si), TiOx, NiOx or CoMnNiOx may be used instead of the VOx film. Thermistor film 7 has generally square or rectangular light receiving surface 7a, and light receiving surface 7a faces second substrate 3. Infrared rays absorbing film 8 is formed on light receiving surface 7a of thermistor film 7. Infrared rays absorbing film 8 is provided to increase the amount of heat of infrared rays that enter thermistor film 7. Infrared rays absorbing film 8 is made of SiOx, but may also be made of SiN, AlOx, TaOx, NbOx, AlN, SiON, AlON, carbon, an organic material and the like.

Thermistor film 7 is supported by support layer 9. The material of support layer 9 is not limited as long as support layer 9 has smaller heat conductivity than wiring layer 10, described later, as well as strength for supporting thermistor film 7, but preferably, support layer 9 is made of an insulator, such as one or more materials selected from the group consisting of insulators, such as AlN, AlOx, diamond-like carbon, SiNx, SiOx, TaOx, TiO$_2$ and Si (x means an arbitrary composition). Support layer 9 has generally square central portion 91 that supports thermistor film 7, as well as a pair of arm portions 92 (hereinafter referred to as first arm portion 92a and second arm portion 92b) that extend from two corners on a diagonal line of central portion 91. Arm portions 92 connect central portion 91 to pillars 11, described later. Furthermore, arm portions 92 are connected to thermistor film 7 via central portion 91. Central portion 91 and arm portions 92 are made of the same material, but may be made of materials that are different from each other. Central portion 91 has a slightly larger two-dimensional area than thermistor film 7, and thermistor film 7 is surrounded by four sides of central portion 91, as viewed in a direction perpendicular to thermistor film 7 (the Z direction). A pair of wiring layers 10 (hereinafter referred to as first wiring layer 10a and second wiring layer 10b) is supported on a pair of arm portions 92 of support layer 9. In the present embodiment, wiring layers 10 are provided on support layer 9, but a part of wiring layers 10 may be provided on thermistor film 7. The configuration of wiring layers 10 will be described later.

First arm portion 92a and second arm portion 92b have the same configuration and are in point symmetry with respect to the center of thermistor film 7. Thus, first arm portion 92a will be described here. First arm portion 92a is a generally L-shaped member that consists of first portion 93 and second portion 94. First portion 93 extends along first side 72a of thermistor film 7 from first corner 71a of thermistor film 7 to the vicinity of second corner 71b that is adjacent to first corner 71a. Second portion 94 is connected to first portion 93 in the vicinity of second corner 71b of thermistor film 7 and extends along second side 72b of thermistor film 7, that is adjacent to first side 72a, from second corner 71b to the vicinity of third corner 71c that is adjacent to second corner 71b. First arm portion 92a is spaced from thermistor film 7 except for the connection of first portion 93 with thermistor film 7. Therefore, heat conduction from thermistor film 7 to first arm portion 92a is limited. Second portion 94 is connected to pillar 11 in the vicinity of third corner 71c.

Support layer 9 is supported by a pair of pillars 11 that extend from first substrate 2 toward second substrate 3. Pillar 11 is a cylindrical body having a circular cross section. Pillar 11, which also functions as an electrode for supplying a sense current to thermistor film 7, is made of a conductive material, such as Ta, Cu, Ru, W, Au, Ni and Fe, and may be made, for example, by plating. Two pillars 11 are connected to the ends of first arm portion 92a and second arm portion 92b, respectively. Thermistor film 7 and support layer 9 are arranged such that they float in inner space 5 and are connected to first substrate 2 of vacuum housing 6 only via pillars 11. As a result, thermal influence from first substrate 2 and second substrate 3 can be limited.

First substrate 2 is composed of a silicon substrate, as well as various elements and circuits that are formed thereon. The elements include an ROIC (Read Out Integrated Circuit), a regulator, an A/D converter, a multiplexer and the like. The ROIC is an integrated circuit that converts the change of resistance of a plurality of thermistor films 7 to electric signals. These elements are connected to pillars 11 via, for example, circuit 13 and pillars 12 in first substrate 2. Second substrate 3 is a window substrate that allows long-wavelength infrared rays to pass through, and is made of a silicon substrate, a germanium substrate, and the like. The wave length of the long-wavelength infrared rays is approximately 8-14 µm. Although not shown, anti-reflective films are formed on the inner and outer surfaces of second substrate 3.

Wiring layers 10 are made of a conductive material, such as Au, $B_4C$, Co, Cu, Fe, Mo, NbC, Ni, Rh, Ru, Ta, TaC, TiN, W and ZrN. Wiring layers 10 are supported by support layer 9, as described above. Further, the surface of wiring layer 10 opposite to the surface that is supported by support layer 9, i.e., the surface that faces second substrate 3, is covered with first insulating layer 15, and the side surfaces of wiring layer 10 are covered with second insulating layers 16. First insulating layer 15 and second insulating layers 16 are made of one or more materials selected from the group consisting of AlN, AlOx, diamond-like carbon, SiNx, SiOx, TaOx, $TiO_2$ and Si.

Second insulating layers 16 are located between support layer 9 and first insulating layer 15 and alternately protrude from both sides in a comb-like manner. As a result, wiring layer 10 forms a meandering pattern in arm portion 92. The pattern of wiring layer 10 is not limited to the meandering pattern, and any non-linear pattern, such as a zigzag pattern, a curved pattern, a polygonal line pattern, etc., may be employed as long as center line C of wiring layer 10 intersects direction D along which arm portion 92 extends in at least a part of arm portion 92. It should be noted that center line C of wiring layer 10 refers to a center line of wiring layer 10 along the bent path thereof and does not correspond to the X direction and the Y direction. Such a pattern is preferably formed over the entire length of arm portion 92, but may only be formed in a part of arm portion 92. Different patterns may be formed in a part of arm portion 92 and in another part of arm portion 92. It is also possible to combine the various patterns described above (for example, a curved zigzag pattern).

If radiation heat energy that enters thermistor film 7 is dissipated through wiring layers 10, then the sensitivity of infrared sensor 1 decreases. Therefore, in order to improve the sensitivity of infrared sensor 1, the present invention aims at limiting heat dissipation from wiring layers 10. The heat dissipation from wiring layers 10 is caused by heat conduction of wiring layers 10. Heat conduction in a solid is caused by the vibration of atoms. It is believed that there are two mechanisms for heat conduction, in particular, in a metal, that is, energy transfer based on vibration that is transferred within a crystal lattice (phonon-lattice vibration) and energy transfer based on the movement of conduction electrons. Since conduction electrons make major a contribution to energy transfer in conductive metals, conductive metals are usually a good conductor of electricity, as well as a good conductor of heat (Viedemann-Franz law). Therefore, wiring layer 10 that is made of a conductor is not negligible as a thermal transfer path, although it has a smaller volume than support layer 9 that is made of an insulator. However, since a certain level of contribution to heat conduction via phonons is present even in a conductive metal, it is possible to limit heat dissipation from wiring layer 10 by lowering heat conduction that is caused by phonons.

In the kinetic molecular theory of gases, the average distance (referred to as a free path) that is travelled by a particle, such as a molecule or an electron, without being disturbed by scattering (collision) by a scattering source (may be the same kind particle or may be a different kind particle), is referred to as the mean free path. A particle performs ballistic linear motion, changes the direction when it collides with a scattering source, and performs ballistic linear motion again. When a particle moves a distance equal to the mean free path, it collides once with another particle on average. The same concept can also be applied to a phonon. The distance that is travelled by a phonon before colliding with another material is stochastically distributed, and the average traveling distance (the mean free path) is an indicator of how easily phonon transport is performed. Thus, reducing heat conduction based on a phonon is synonymous with reducing the mean free path of a phonon.

Figure 3:
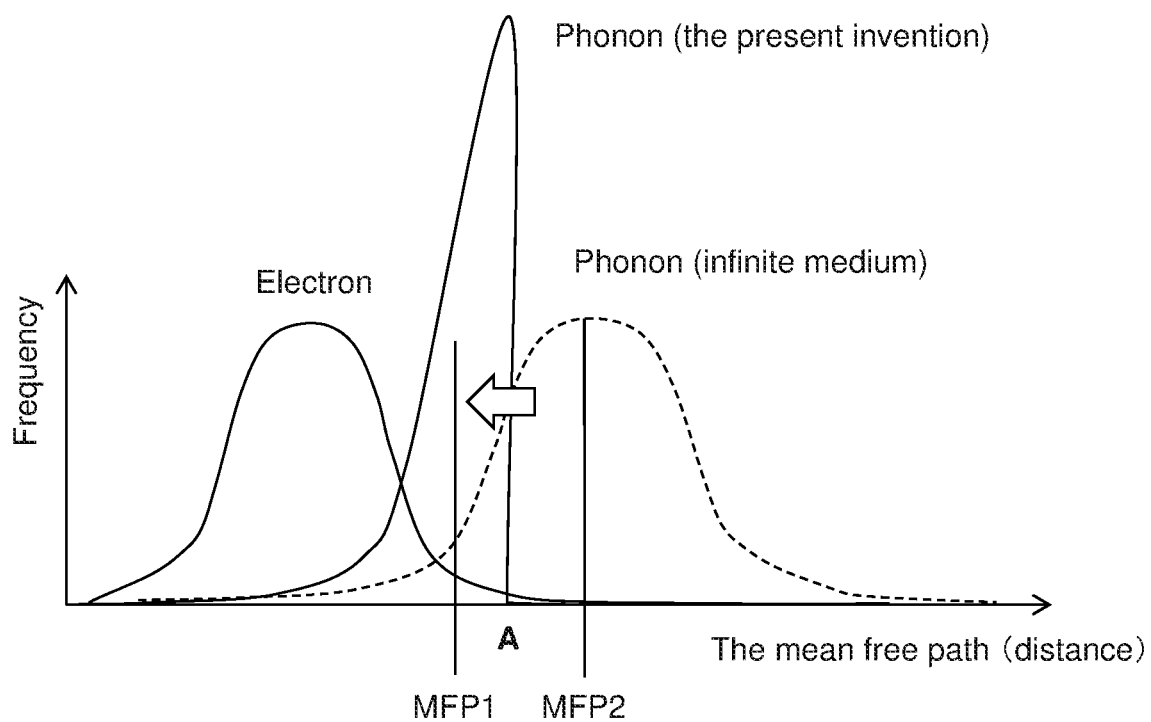
FIG. 3 is a schematic view illustrating the principle of the present invention.

FIG. 3 is a schematic view illustrating the principle of the present invention. Since the mean free path of electrons is based on the infinite medium, the mean free path of electrons in wiring layer 10 is smaller than the value that is based on the infinite medium. However, since the mean free path of electrons is short (up to several hundred nm), the mean free path of electrons in wiring layer 10 can be regarded as substantially same as the value based on the infinite medium, regardless of the arrangement of wiring layer 10. On the other hand, it is known that the mean free path of phonons at room temperature is calculated as (3× heat conductivity)/(heat capacity×the speed of sound). Since the mean free path of phonons is also based on the infinite medium, mean free path MFP1 of phonons in wiring layer 10 is smaller than mean free path MFP2 of phonons in the infinite medium. As well, considering that the mean free path of phonons is several µm, which is longer than the mean free path of electrons, the mean free path of phonons is more affected by the arrangement of wiring layer 10 than the mean free path of electrons. Therefore, by adopting an arrangement that reduces the mean free path of phonons, it is possible to realize wiring layer 10 in which heat conduction is reduced while a decrease in electric conductivity is limited.

Figure 4A:
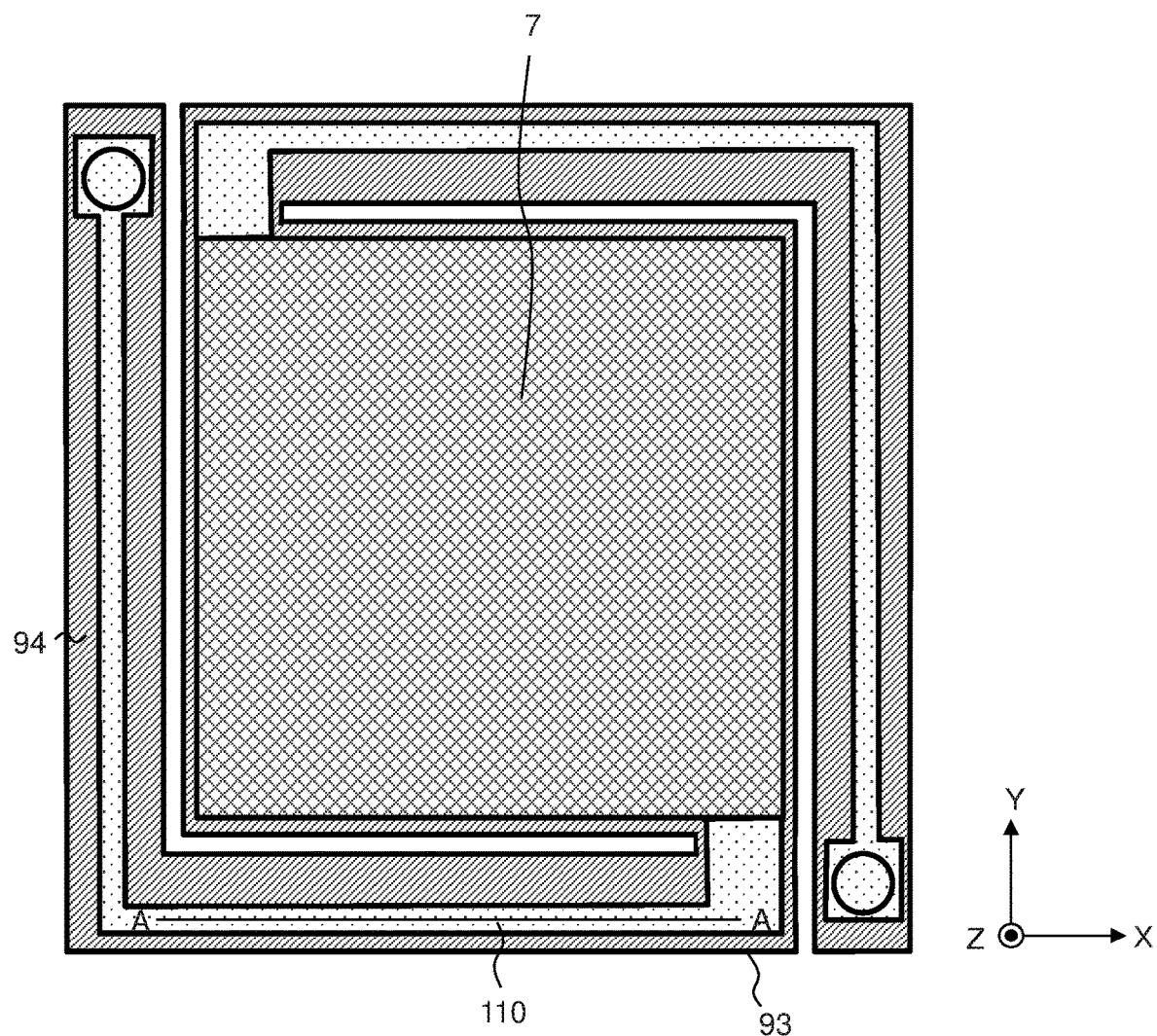
FIG. 4A is a schematic plan view in the vicinity of the thermistor film of an infrared sensor of a comparative example.
Figure 4B:
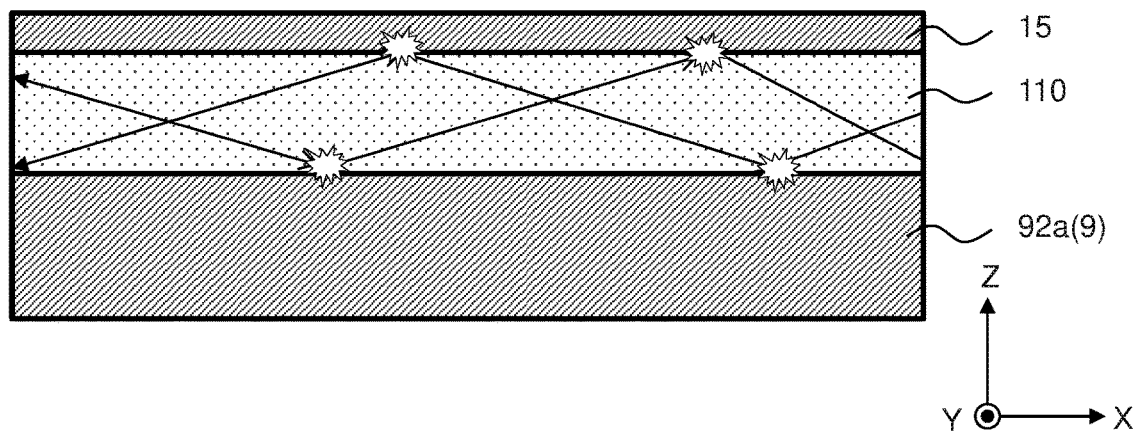
FIG. 4B is a sectional view of the wiring layer taken along line A-A in FIG. 4A.
Figure 4C:
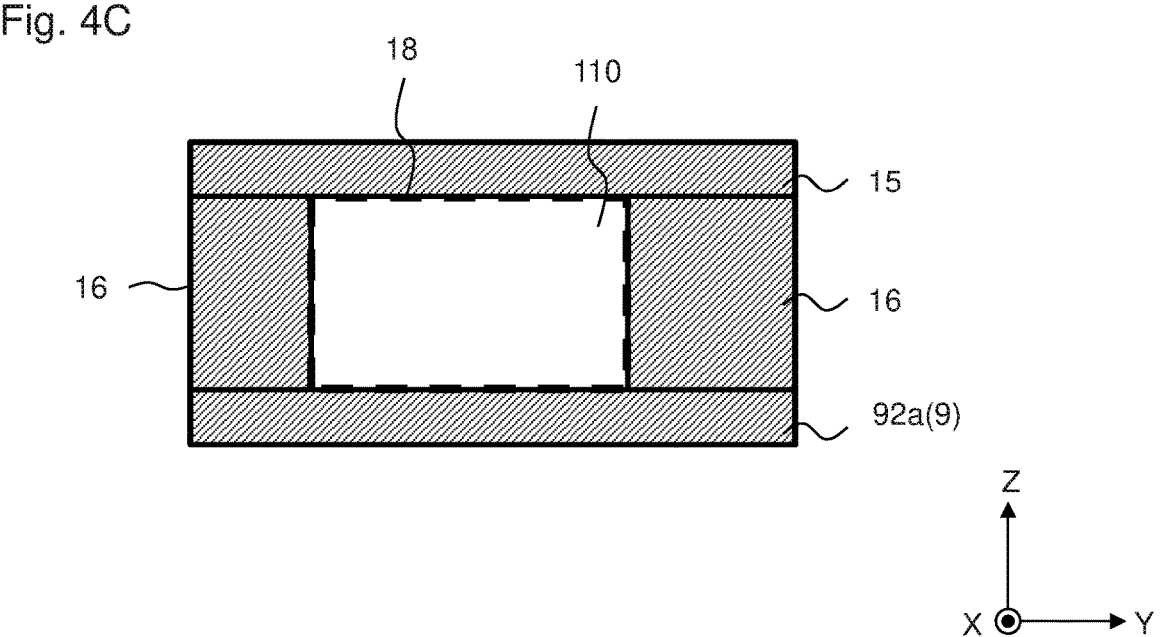
FIG. 4C is a sectional view of the wiring layer, as viewed in the X direction.

Based on the basic principle above, the present embodiment provides an arrangement of a wiring layer in which the mean free path of electrons is substantially unaffected and only the mean free path of phonons is reduced. FIG. 4A shows a schematic plan view in the vicinity of thermistor film 7 of an infrared sensor having wiring layer 110 of a comparative example, FIG. 4B shows a sectional view of wiring layer 110 taken along line A-A in FIG. 4A, and FIG. 4C shows a sectional view of wiring layer 110, as viewed in the X direction. Wiring layer 110, that is made of a straight conductive layer, follows the shape of arm portion 92, and is bent at a right angle at a position between both ends of wiring layer 110. Thus, in an extreme case, a phonon will reach pillar 11, that is positioned at the end, in three ballistic phonon transports (that is, after being reflected only twice by the boundary of wiring layer 110). In contrast, in the present embodiment, a phonon moves along the meandering arrangement, so that the phonon reaches pillars 11, that is positioned at the end, after a very large number of ballistic phonon transports (41 times in the example shown in FIG. 2A). It should be noted that each arrow in FIGS. 2A and 4A indicates one ballistic phonon transport. On the other hand, although not illustrated, since the mean free path of electrons is much shorter than the mean free path of phonons, an electron is scattered many times between both ends of wiring layer 110 even in linear wiring layer 110, and the number of times the electron is scattered is not significantly different from the number of times the electron is scattered in wiring layer 10 having a meandering pattern. That is, the walls along the path that are generated by the meandering pattern work as a new scattering source for phonons, i.e., a new impediment to the conduction of phonons, and only the conductivity of phonons is lowered. In FIG. 3, the frequency with which free paths that are larger than A occur is almost zero. This is because A corresponds to the longest path of the ballistic phonon transport, which is geometrically determined by the meandering pattern. The mean free path of phonons in wiring layer 10 is preferably smaller than the mean free path of phonons in the infinite medium that is made of the material of wiring layer 10.

In both the present embodiment and the comparative example, single band region 18 that extends along arm portion 92 is formed (FIGS. 2C and 4C). At least a part of each periphery 18a in the width direction (the Y direction in first portion 93, and the X direction in second portion 94) of band region 18 and at least a part of each periphery 18b in the thickness direction (the Z direction) are made of a conductive material. The conductive material forms wiring layer 10, 110 that continuously extends along arm portion 92 from one end that is connected to thermistor film 7 to the other end that is connected to pillar 11. In the comparative example, the entire part of single band region 18 is filled with wiring layer 110, and the conductive material does not have a boundary with a material having a smaller heat conductivity than the conductive material inside single band region 18. "Inside single band region 18" means a region that does not contain a boundary surface of single band region 18 and that is inside the boundary surface of single band region 18. On the other hand, in the present embodiment, the conductive material has a boundary with a material having a smaller heat conductivity than the conductive material inside single band region 18. This boundary is an additional scattering source for phonons.

Second Embodiment

Figure 5A:
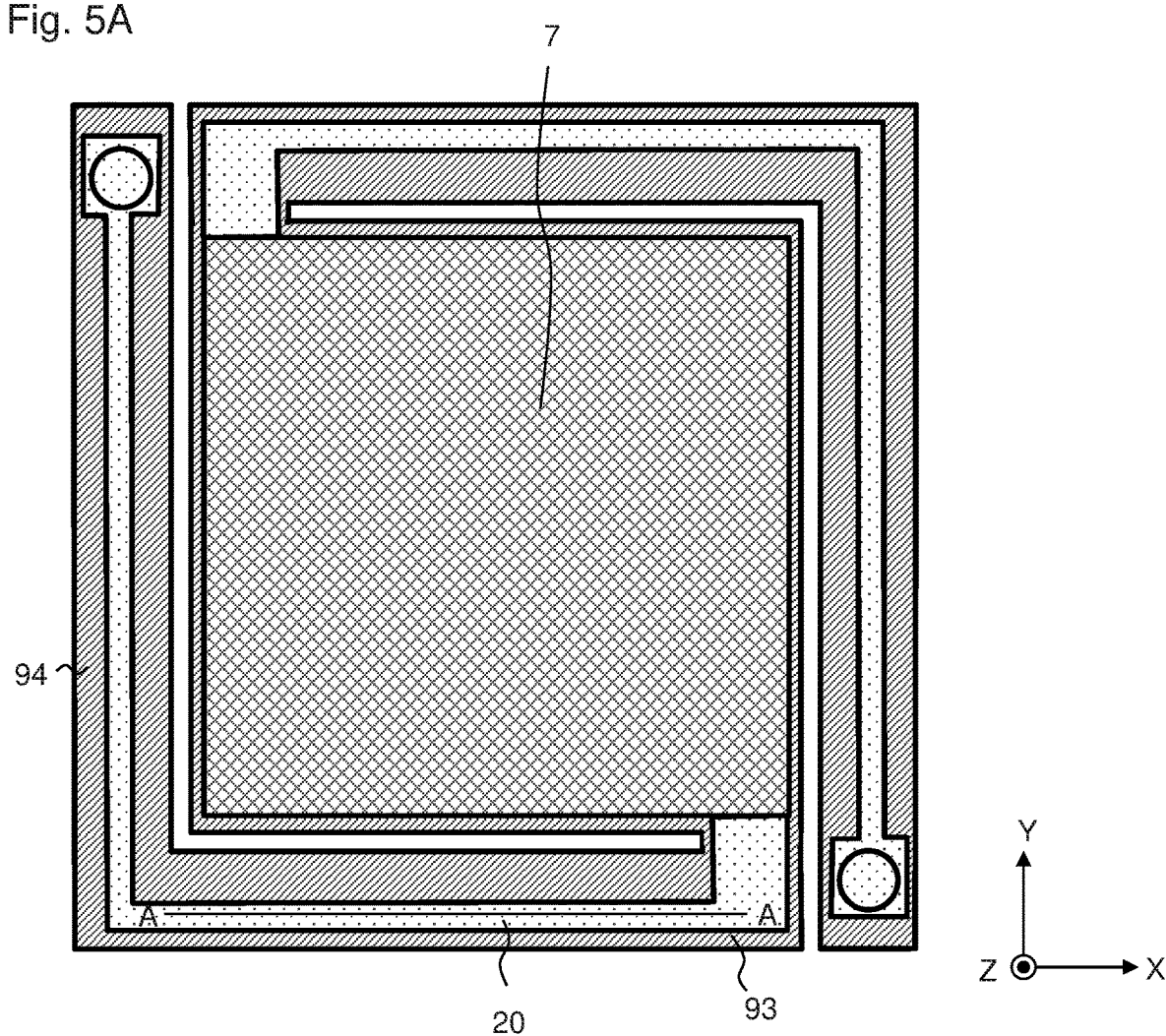
FIG. 5A is a schematic plan view in the vicinity of the thermistor film of an infrared sensor according to a second embodiment of the present invention.
Figure 5B:
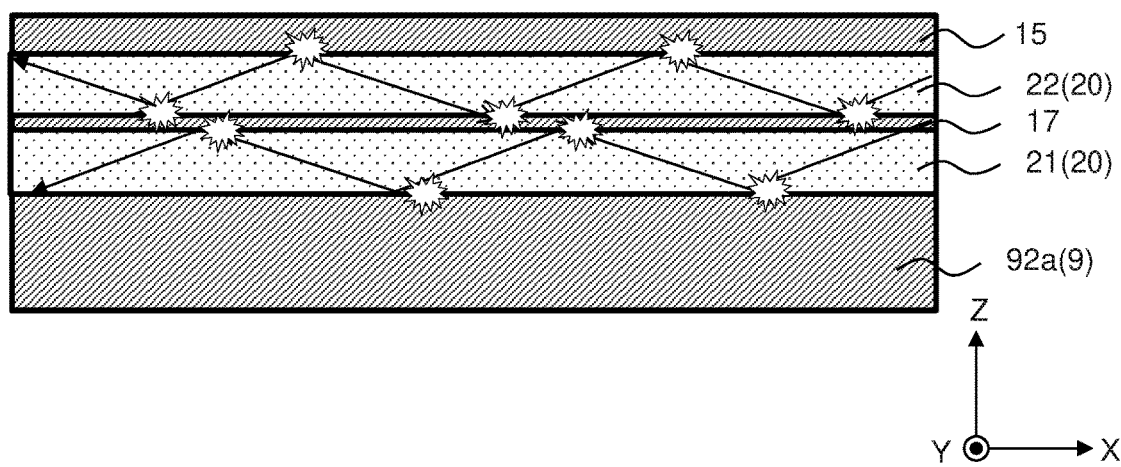
FIG. 5B is a sectional view of the wiring layer taken along line A-A in FIG. 5A.

FIG. 5A is a schematic plan view in the vicinity of thermistor film 7 of the infrared sensor of the second embodiment, and FIG. 5B shows a sectional view of wiring layer 20 taken along line A-A in FIG. 5. Here, the difference from the first embodiment will be mainly described. Configurations and effects that are not explained are the same as those of the first embodiment.

In the present embodiment, wiring layer 20 is separated or divided in the thickness direction (the Z direction) by separating layer 17. First wiring layer 21 is formed on support layer 9 (first arm portion 92a and second arm portion 92b), separating layer 17 is formed on first wiring layer 21, second wiring layer 22 is formed on separating layer 17, and second wiring layer 22 is covered with first insulating layer 15. Separating layer 17 is made of one or more materials selected from the group consisting of AlN, AlOx, diamond-like carbon, SiNx, SiOx, TaOx, and $TiO_2$. Separating layer 17 may be made of the same material as that of support layer 9 or may be made of a material different from that of support layer 9 as long as separating layer 17 has a smaller heat conductivity than wiring layer 20. The number of layers into which wiring layer 20 is divided or the number of separating layers 17 is not limited, and wiring layer 20 may be divided into three or more layers by inserting a plurality of separating layers 17 into wiring layer 20. In other words, at least one separating layer 17 may be inserted into wiring layer 20.

Figure 5C:
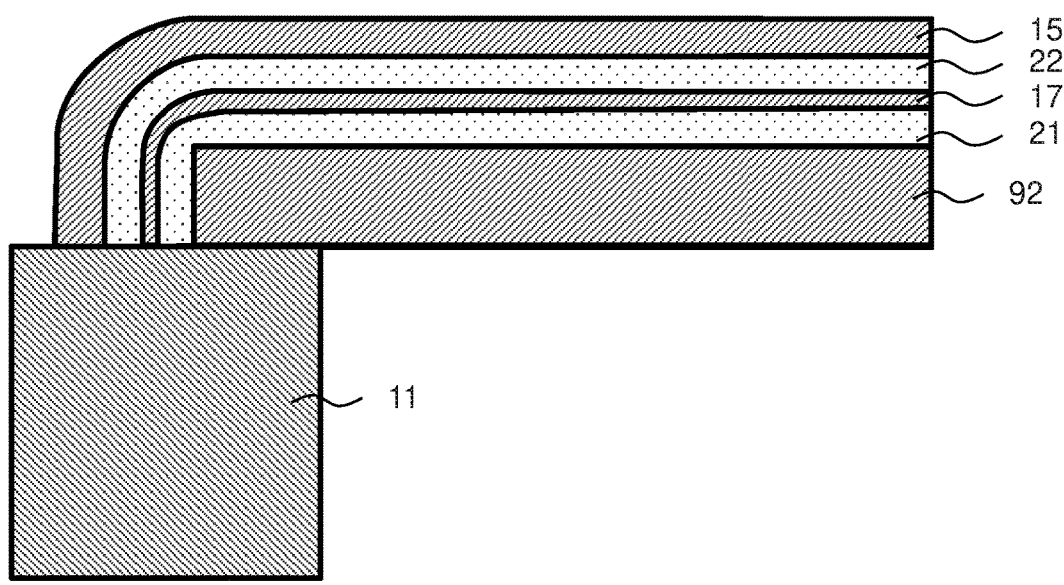
FIG. 5C is a side view in the vicinity of the end of the wiring layer and a pillar.

FIG. 5C shows a side view in the vicinity of the end of wiring layer 20 and pillar 11. When first wiring layer 21, separating layer 17 and second wiring layer 22 are formed above support layer 9, these layers 21, 16, 22 are also deposited on the side of support layer 9 by adjusting the angle of sputtering. As a result, wiring layer 20 that is divided in the thickness direction (the Z direction) can be electrically connected to pillar 11.

As shown in FIG. 5B, phonon may move not only in parallel with wiring layer 20, but also obliquely relative to wiring layer 20 (that is, with a component in the Z direction). Thus, inserting separating layer 17 increases the boundaries of wiring layer 20, as well as scattering sources for phonons. Accordingly, it is also possible in the present embodiment to realize wiring layer 20 in which heat conduction is reduced while a decrease in electric conductivity is limited. In addition, wiring layer 20 can be easily produced in the wafer manufacturing process. That is, since separating layer 17 and wiring layer 20 that is divided by separating layer 17 are parallel to first substrate 2, wiring layer 20 having a desired arrangement can be obtained only by repeating simple processes. Further, since a wiring layer typically has a width (a dimension in the X direction or in the Y direction) that is larger than a thickness (a dimension in the Z direction), the area of the surface of the separating layer can be more easily ensured by dividing the wiring layer in the thickness direction than by dividing the wiring layer in the width direction. As a result, scattering sources for phonons can be efficiently increased.

Third Embodiment

Figure 6A:
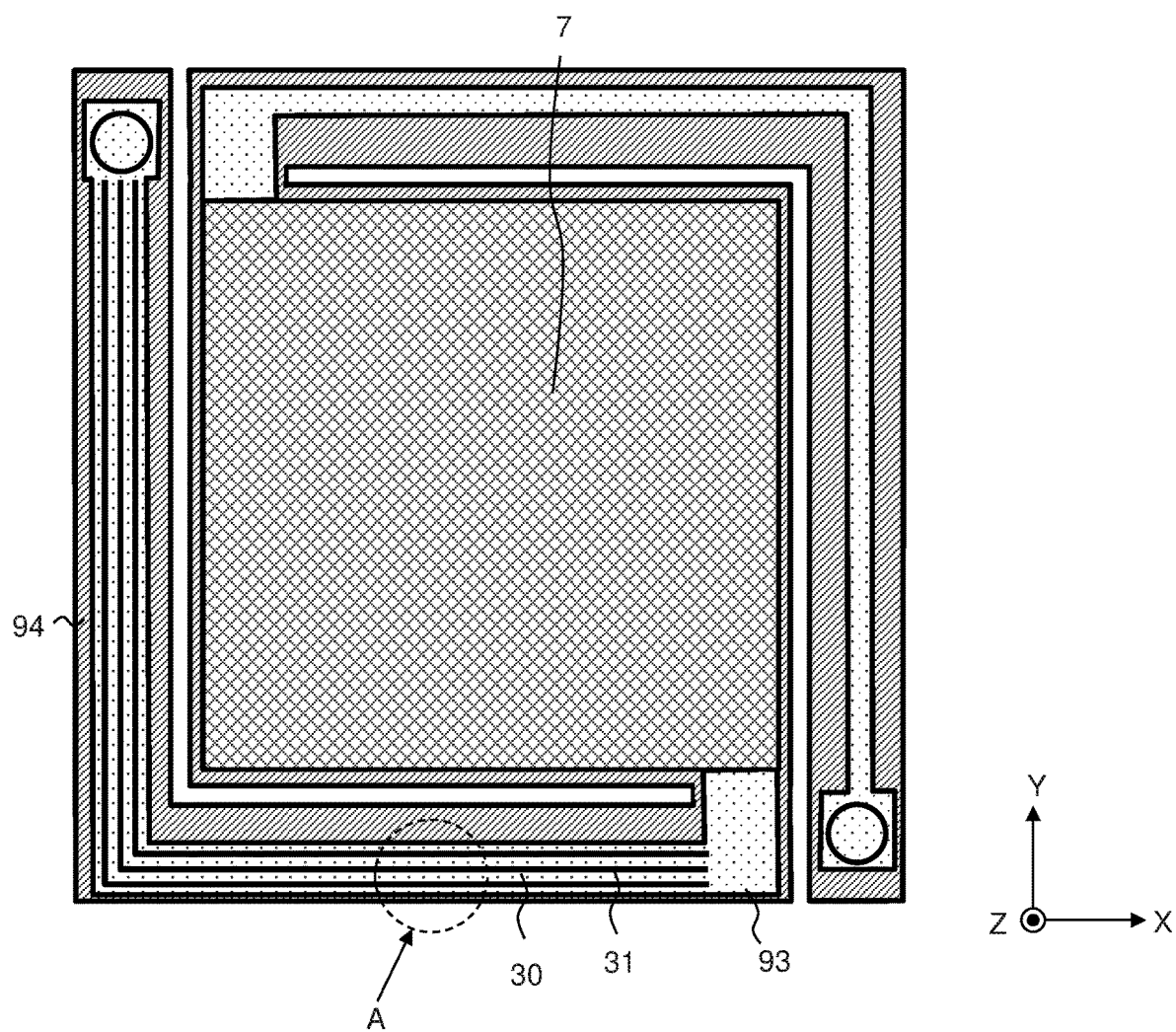
FIG. 6A is a schematic plan view in the vicinity of the thermistor film of an infrared sensor according to a third embodiment of the present invention.
Figure 6B:
FIG. 6B is a sectional view of the wiring layer taken along line A-A in FIG. 6A.
Figure 6B:
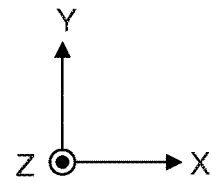
Figure 6C:
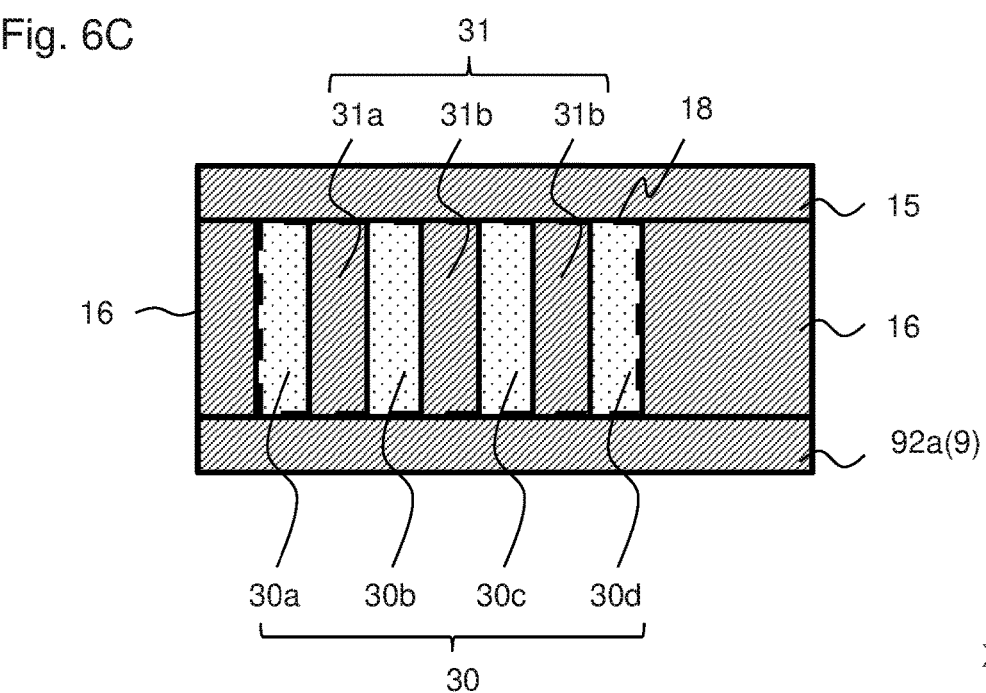
FIG. 6C is a sectional view of the wiring layer, as viewed in the X direction.
Figure 6C:
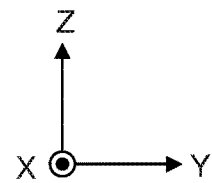

FIG. 6A shows a schematic plan view in the vicinity of thermistor film 7 of the infrared sensor of the third embodiment, FIG. 6B shows an enlarged view of portion A in FIG. 6, and FIG. 6C shows a sectional view of portion A, as viewed in the X direction. Here, the difference from the first embodiment will be mainly described. Configurations and effects that are not explained are the same as those of the first embodiment.

In the present embodiment, wiring layer 30 is separated or divided in the width direction by separating layers 31. More specifically, wiring layer 30 is separated or divided in the Y direction by separating layers 31 in first portion 93 of first arm portion 92a and is separated or divided in the X direction by separating layers 31 in second portion 94. First to fourth wiring layers 30a to 30d that extend in parallel with each other are formed on support layer 9 (first arm portion 92a), with first separating layer 31a being provided between first wiring layer 30a and second wiring layer 30b, second separating layer 31b being provided between second wiring layer 30b and third wiring layer 30c, and third separating layer 31c being provided between third wiring layer 30c and fourth wiring layer 30d. First to fourth wiring layers 30a to 30d and first to third separating layers 31a to 31c are covered with first insulating layer 15. First to third separating layer 31a to 31c are made of one or more materials selected from the group consisting of AlN, AlOx, diamond-like carbon, SiNx, SiOx, TaOx, TiO$_2$, and Si. First to third separating layers 31a to 31c may be made of the same material as that of support layer 9, or may be made of a material different from that of support layer 9 as long as separating layers 31a to 31c have a smaller heat conductivity than wiring layer 30. The number of layers into which wiring layer 30 is divided or the number of separating layers 31 are not limited, and wiring layer 30 may be divided or separated by inserting an arbitrary number of separating layers 31 into wiring layer 30. In other words, at least one separating layer 31 may be inserted into wiring layer 30.

Although not shown, as described in the second embodiment, phonon may move not only in parallel with wiring layer 30, but also obliquely relative to wiring layer 30 (that is, with a component in the Y direction in first portion 93, and with a component in the X direction in second portion 94). Thus, inserting separating layer 31 increases the boundaries of wiring layer 30, as well as scattering sources for phonons. Accordingly, it is also possible in the present embodiment to realize wiring layer 30 in which heat conduction is reduced while a decrease in electric conductivity is limited.

Fourth Embodiment

Figure 7:
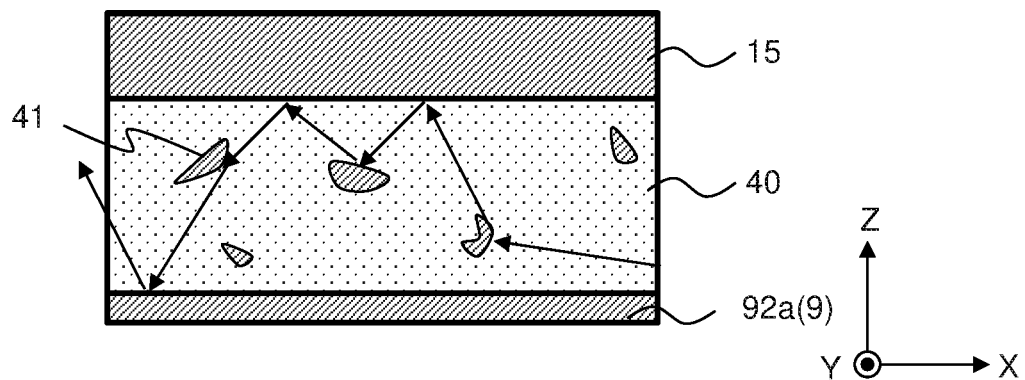
FIG. 7 is a partial sectional view of the wiring layer of an infrared sensor according to a fourth embodiment of the present invention.

FIG. 7 shows a sectional view of wiring layer 40 of the infrared sensor of the fourth embodiment. Here, the difference from the first embodiment will be mainly described. Configurations and effects that are not explained are the same as those of the first embodiment.

Scattered bodies 41 having a smaller heat conductivity than wiring layer 40 are scattered in wiring layer 40. Since the conductive portion of wiring layer 40 is continuous from one end to the other end of wiring layer 40, wiring layer 40 is not divided by scattered bodies 41 in the direction along which wiring layer 40 extends. Scattered bodies 41 are made of one or more materials selected from the group consisting of AlN, AlOx, diamond-like carbon, SiNx, SiOx, TaOx, TiO$_2$ and Si. The shape of scattered bodies 41 is not particularly limited, and may be lumpy, linear etc. Providing scattered bodies 41 increases the boundaries of wiring layer 40, as well as scattering sources for phonons in the same manner as in the other embodiments. Accordingly, it is also possible in the present embodiment to realize wiring layer 40 in which heat conduction is reduced while a decrease in electric conductivity is limited.

(Method of Manufacturing Infrared Sensor 1)

Next, referring to FIGS. 8A to 8E, an exemplary method of manufacturing infrared sensor 1 of the present invention will be shown. Since infrared sensor 1 is made in the wafer manufacturing process, first substrate 2, second substrate 3 and silicon substrate 3a mean wafers as per the following description. Here, the first embodiment will be explained as an example, and regarding the other embodiments, the difference from the first embodiment will be described.

Figure 8A:
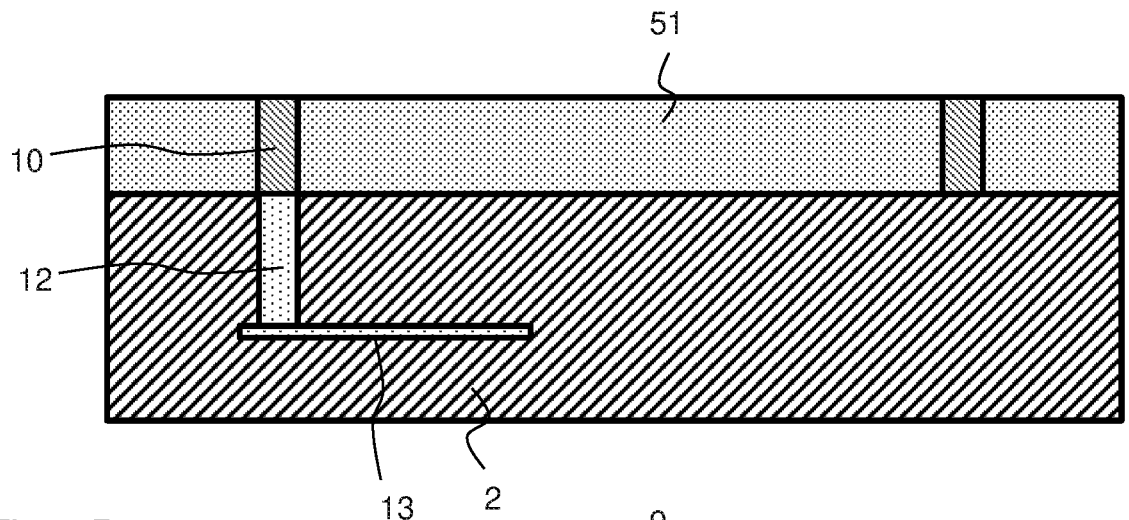
FIGS. 8A to 8E are views illustrating exemplary steps of a method for manufacturing an infrared sensor of the present invention.
Figure 8B:
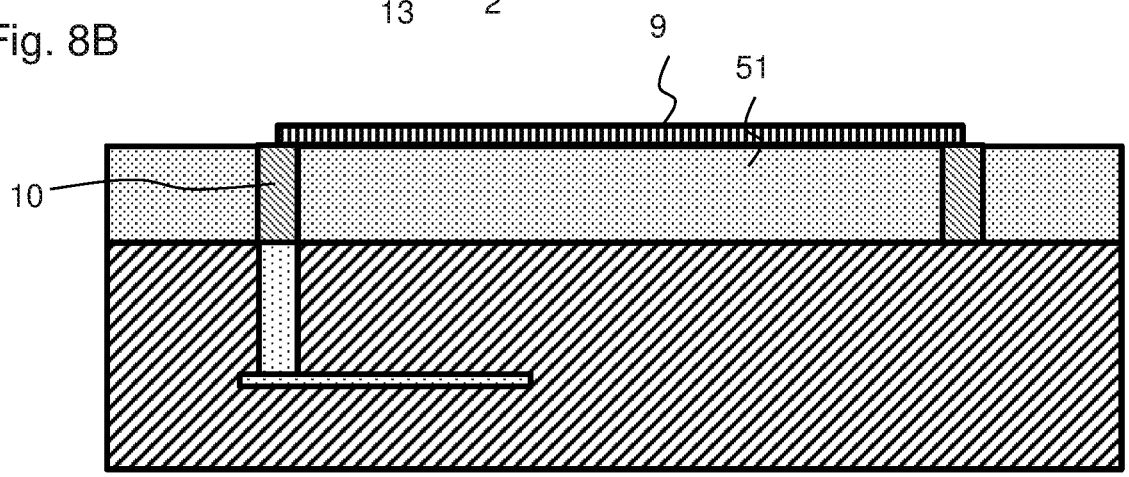
Figure 8C:
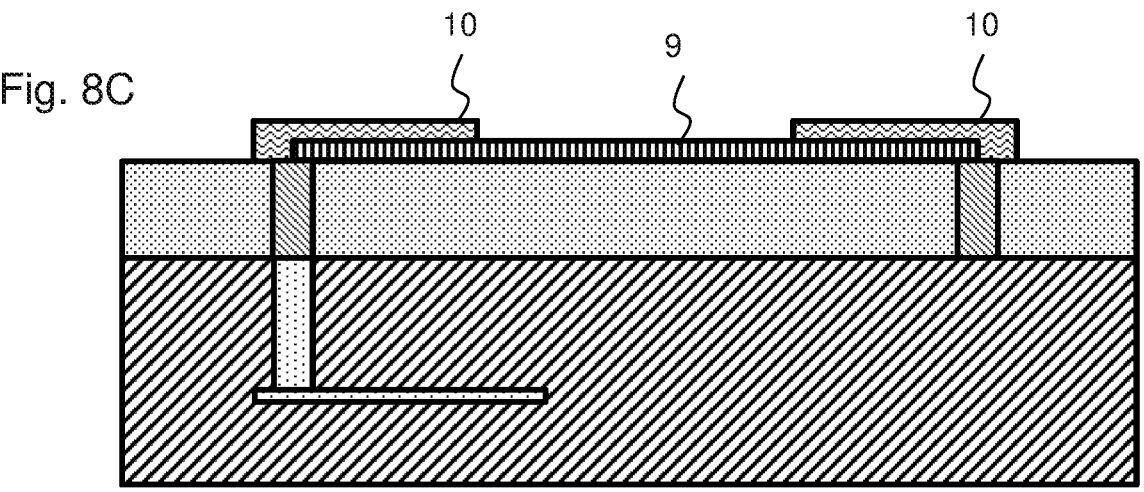
Figure 8D:
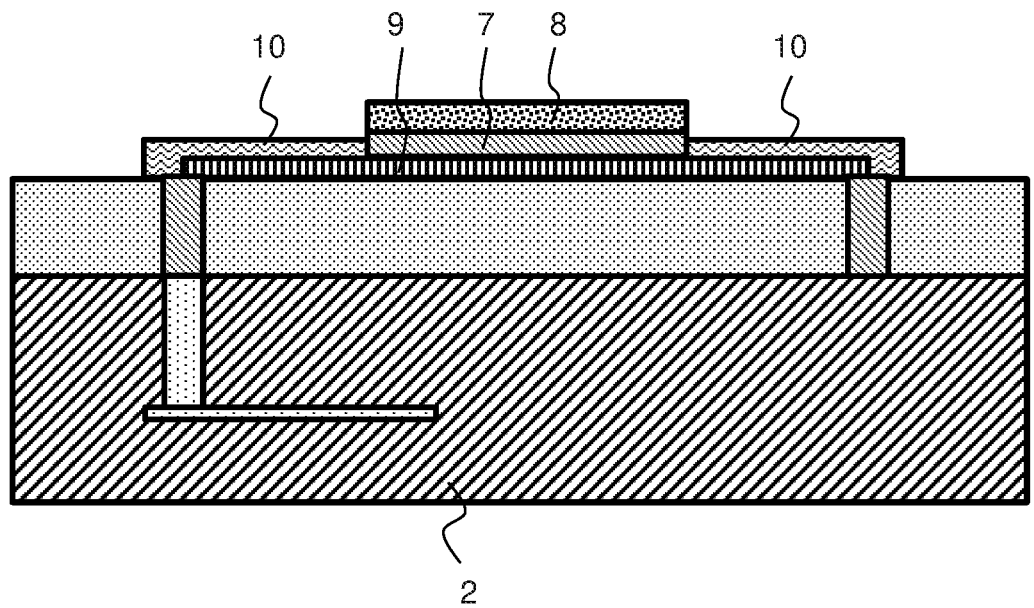
Figure 8E:
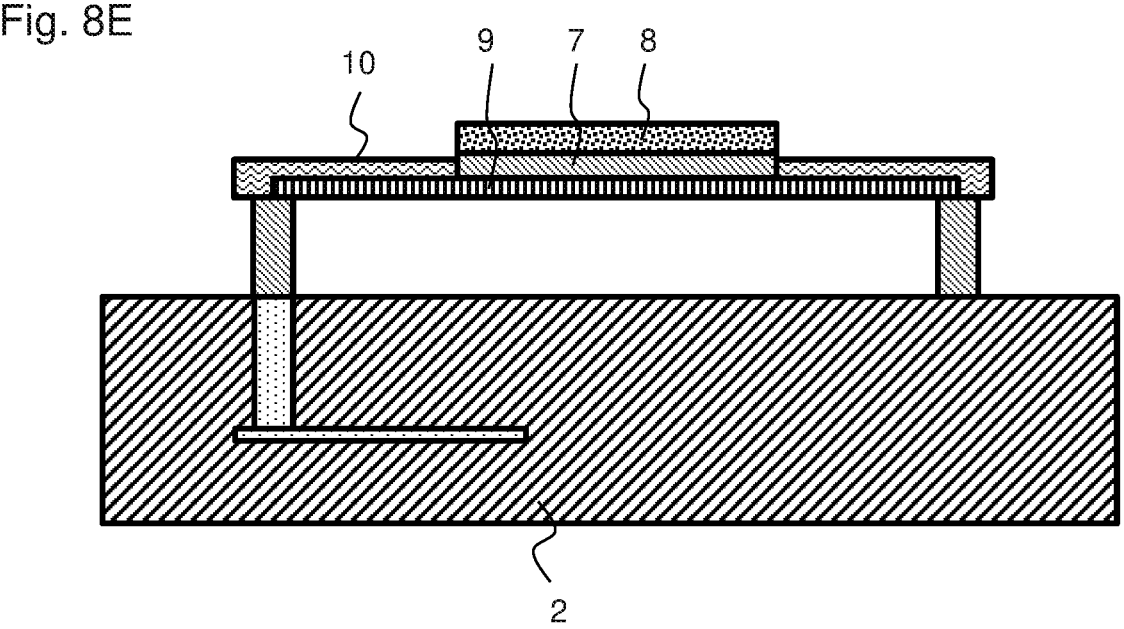

First, as shown in FIG. 8A, organic sacrifice layer 51 is formed on first substrate 2, on which elements, such as an ROIC, are formed. Openings are then formed by means of a photo resist process and a milling process, and pillars 11 are formed in the openings by means of plating. Next, as shown in FIG. 8B, support layer 9 is formed both on organic sacrifice layer 51 and on pillars 11 by means of sputtering. Next, as shown in FIG. 8C, wiring layers 10 are formed on support layer 9 by means of sputtering, and wiring layers 10 are formed into a predetermined shape by means of a patterning process. In the second embodiment, a desired number of pairs of separating layer 17 and the conductive layer are further stacked. In the third embodiment, openings are formed in wiring layer 30 by means of a photo resist process and a milling process, and insulating layers 31 are formed in the openings. In the fourth embodiment, wiring layer 40 is formed by a method, such as simultaneously sputtering a conductive material and scattered bodies 41 or sputtering a mixture of a conductive material and scattered bodies 41. Next, as shown in FIG. 8D, thermistor film 7 and infrared rays absorbing film 8 are formed on support layer 9 by means of sputtering. Next, as shown in FIG. 8E, organic sacrifice layer 51 is removed by means of a drying process. Thereafter, first substrate 2 and second substrate 3 are bonded in a vacuum atmosphere in order to obtain infrared sensor 1 shown in FIG. 1.

Although certain preferred embodiments of the present invention have been shown and described in detail, it should be understood that various changes and modifications may be made without departing from the spirit or scope of the appended claims. For example, the first to fourth embodiments may be combined with each other. For example, it is possible to form a wiring layer having a meandering pattern, as described in the first embodiment, and to provide separating layer 31 that separates the wiring layer in the thickness direction, as described in the second embodiment.

What is claimed is:
1. A heat utilizing device comprising:
   a thermistor whose electric resistance changes depending on temperature; and
   first and second wiring layers that are connected to the thermistor,
   at least one separating layer that separates the first wiring layer in a thickness direction of the first wiring layer, wherein the at least one separating layer has a smaller heat conductivity than the first wiring layer.
2. The heat utilizing device according to claim 1, further comprising a support layer that supports the thermistor and the first and second wiring layers, wherein the support layer has a smaller heat conductivity than the first and second wiring layers.
3. The heat utilizing device according to claim 2, further comprising:
   a housing that forms an inner space that is at a negative pressure as compared to outside; and
   first and second pillars that are supported by the housing in the inner space,
   wherein the thermistor, the first and second wiring layers and the support layer are housed in the inner space, and the support layer is connected to the housing only via the first and second pillars.
4. The heat utilizing device according to claim 3, wherein the support layer comprises:
   a central portion that supports the thermistor;
   a first arm portion that holds at least a part of the first wiring layer and that connects the central portion to the first pillar; and a second arm portion that holds at least a part of the second wiring layer and that connects the central portion to the second pillar.

5. The heat utilizing device according to claim 4, wherein the at least a part of the first wiring layer that is held by the first arm portion is non-linear and a center line of the at least a part of the first wiring layer intersects a direction in which the first arm portion extends.

6. The heat utilizing device according to claim 1, further comprising scattered bodies that are scattered in the first and second wiring layers, wherein the scattered bodies have a smaller heat conductivity than the first and second wiring layers.

7. The heat utilizing device according to claim 1, further comprising:
   an arm portion that is connected to the thermistor; and
   a band region that extends along the arm portion, wherein at least a part of a periphery of the band region in a width direction thereof and at least a part of a periphery of the band region in a thickness direction thereof are made of a conductive material,
   wherein the conductive material continuously extends from one end thereof that is connected to the thermistor to another end thereof, and the conductive material has a boundary with a material having a smaller heat conductivity than the conductive material inside the band region.

8. The heat utilizing device according to claim 1, wherein a mean free path of phonons in the first wiring layer is smaller than a mean free path of phonons in an infinite medium that consists of a material of the first wiring layer, and a mean free path of phonons in the second wiring layer is smaller than a mean free path of phonons in an infinite medium that consists of a material of the second wiring layer.

9. The heat utilizing device according to claim 1, wherein portions into which the first wiring layer is separated are connected in parallel.

10. A heat utilizing device comprising:
    a thermistor whose electric resistance changes depending on temperature;
    first and second wiring layers that are connected to the thermistor, and
    at least one separating layer that separates the first wiring layer in a width direction of the first wiring layer, wherein the separating layer has a smaller heat conductivity than the first wiring layer.

* * * * *